(12) United States Patent
Yinko, Jr. et al.

(10) Patent No.: US 8,763,484 B2
(45) Date of Patent: Jul. 1, 2014

(54) BREAKAWAY DRIVE SYSTEM

(75) Inventors: Richard H. Yinko, Jr., Sheboygan, WI (US); Robert G. Girard, Saukville, WI (US)

(73) Assignee: Woodstock Safety Mirror Company, Inc., Shokan, NY (US)

( * ) Notice: Subject to any disclaimer, the term of this patent is extended or adjusted under 35 U.S.C. 154(b) by 297 days.

(21) Appl. No.: 13/269,287

(22) Filed: Oct. 7, 2011

(65) Prior Publication Data

US 2012/0085184 A1 Apr. 12, 2012

Related U.S. Application Data

(60) Provisional application No. 61/391,435, filed on Oct. 8, 2010.

(51) Int. Cl.
*F16H 3/06* (2006.01)
*F16H 27/02* (2006.01)
*F16H 29/02* (2006.01)
*F16H 29/20* (2006.01)
*B60Q 1/26* (2006.01)

(52) U.S. Cl.
USPC .............................. 74/89.38; 74/89; 340/433

(58) Field of Classification Search
USPC ......... 74/89, 89.38, 405, 412 TA, 522.5, 527, 74/584; 40/429, 430, 530, 531, 533, 591; 116/51, 52; 192/54.1, 54.52, 55.1, 192/55.6, 55.62, 56.6–56.62, 69.5, 69.62, 192/150; 248/476, 573, 574; 340/425.5, 340/426.22, 426.23, 433, 480, 487; 464/35–38
See application file for complete search history.

(56) References Cited

U.S. PATENT DOCUMENTS

| | | | | | |
|---|---|---|---|---|---|
| 2,600,674 | A | * | 6/1952 | Natkins | 464/36 |
| 3,153,398 | A | * | 10/1964 | Runkle et al. | 116/28 R |
| 4,386,689 | A | * | 6/1983 | Kato | 464/36 |
| 4,728,181 | A | * | 3/1988 | Kakinuma | 248/549 |
| 5,132,662 | A | * | 7/1992 | Burch | 340/433 |
| 5,190,499 | A | * | 3/1993 | Mori et al. | 464/36 |
| 5,857,913 | A | * | 1/1999 | Fujimura et al. | 464/36 |
| 6,052,931 | A | * | 4/2000 | Werner | 40/505 |
| 6,765,481 | B2 | * | 7/2004 | Haigh et al. | 340/433 |
| 7,474,201 | B2 | * | 1/2009 | Swanger | 340/433 |
| 2009/0078524 | A1 | * | 3/2009 | Christensen et al. | 192/55.1 |

* cited by examiner

*Primary Examiner* — Troy Chambers
*Assistant Examiner* — Jake Cook
(74) *Attorney, Agent, or Firm* — McAndrews, Held & Malloy, Ltd.

(57) ABSTRACT

Certain embodiments provide a breakaway drive system that includes an actuator, an actuator breakaway, a shaft breakaway and a drive shaft. The actuator breakaway is operably connected to the actuator and is configured to rotate when the actuator is displaced. The shaft breakaway includes a breakaway mechanism for disengagingly connecting the actuator breakaway to the shaft breakaway. The shaft breakaway rotates in unison with the actuator breakaway when the shafts are operably engaged and does not rotate in unison with the actuator breakaway when the shafts are disengaged. The drive shaft is operably connected to the shaft breakaway such that rotation of the shaft breakaway causes rotation of the drive shaft. An external force on the drive shaft that exceeds a threshold causes rotation of the shaft breakaway such that the breakaway mechanism disengages the shaft breakaway and the actuator breakaway.

20 Claims, 6 Drawing Sheets

BREAKAWAY DRIVE SYSTEM

CROSS-REFERENCE TO RELATED APPLICATIONS/INCORPORATION BY REFERENCE

The present application claims priority under 35 U.S.C. §119(e) to U.S. Provisional Patent Application Ser. No. 61/391,435, filed on Oct. 8, 2010.

The above referenced provisional patent application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF INVENTION

Certain embodiments of the invention relate to breakaway drive systems for use in connection with vehicle signage. More specifically, certain embodiments of the invention relate to breakaway drive systems for protecting vehicle signage extension mechanisms from damage caused by external forces.

BACKGROUND OF THE INVENTION

Signage configured to be extended from a side of a vehicle, such as a stop sign and/or mirror configured to be extended from a side of school bus, for example, requires a mechanism to extend and retract the signage. Such mechanisms should reliably actuate the signage from a closed position substantially parallel to the side of the vehicle to an open position substantially perpendicular to the side of the vehicle. It is also desirable that such mechanisms are resistant to failure when exposed to excessive forces while moving from the closed position to the open position, for example, if a gust of wind strikes the signage while it is moving from the closed position to the open position. Known mechanisms are prone to failure when such forces are exerted on the signage. Thus, improved drive systems are desirable.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

An apparatus and/or method is provided for breakaway drive systems for use in connection with vehicle signage, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWING(S)

Figure 1:
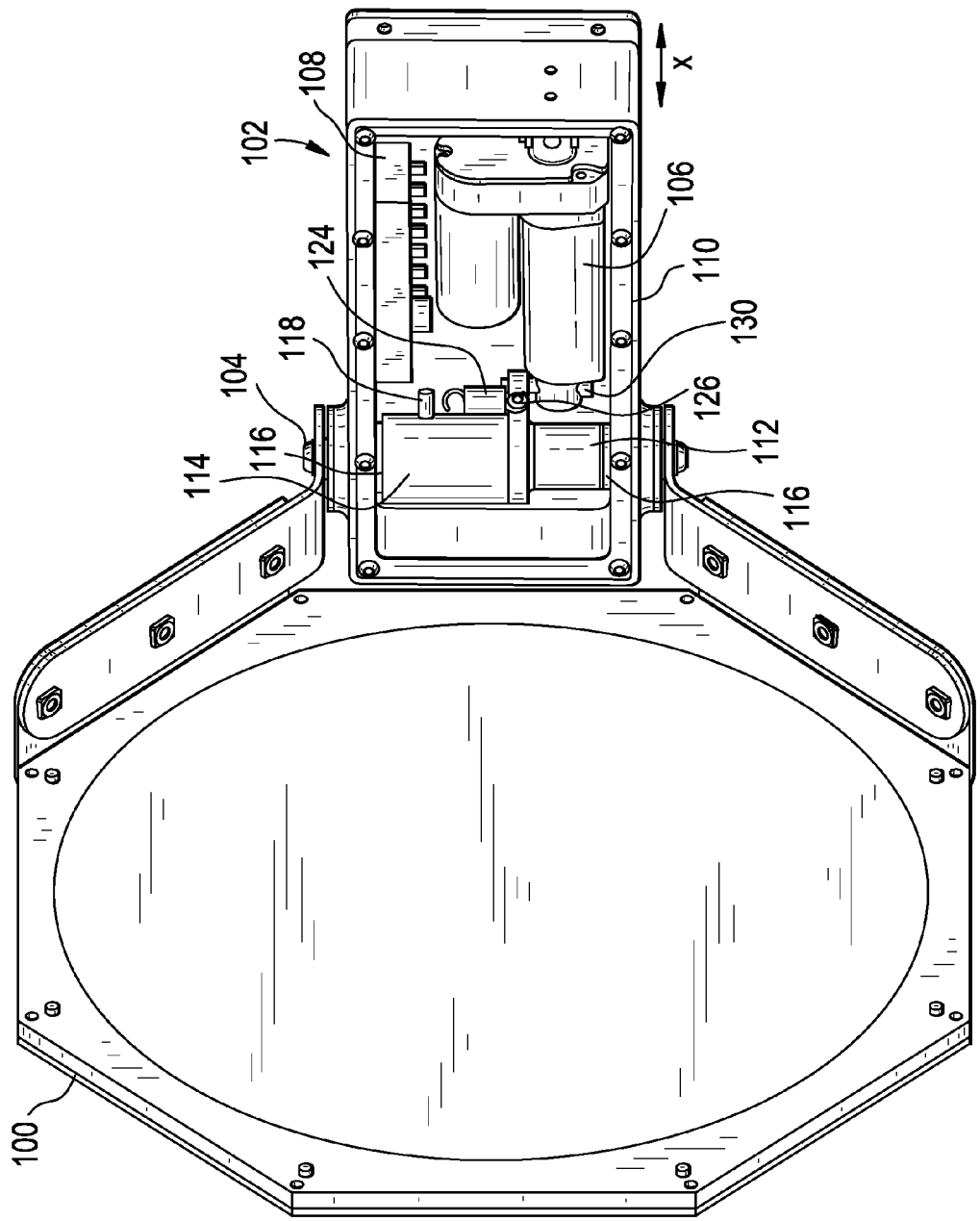
FIG. 1 is a perspective view of a signage holder coupled to an exemplary breakaway drive system used in accordance with an embodiment of the present technology.

The foregoing summary, as well as the following detailed description of embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF PREFERRED EMBODIMENT(S)

Embodiments of the present technology provide breakaway drive systems for use in connection with vehicle signage, and methods of use.

Various embodiments provide a breakaway drive system 102 comprising an actuator 106. The breakaway drive system 102 comprises an actuator breakaway 112 operably connected 130 to the actuator 106. The actuator breakaway 112 is configured to be rotated when the actuator 106 is displaced. The breakaway drive system 102 comprises a shaft breakaway 114 comprising a breakaway mechanism 120, 122 for disengagingly connecting the actuator breakaway 112 to the shaft breakaway 114. The shaft breakaway 114 rotates in unison with the actuator breakaway 112 when the shafts are operably engaged. The shaft breakaway 114 does not rotate in unison with the actuator breakaway 112 when the shafts 112, 114 are disengaged. The breakaway drive system 102 comprises a drive shaft 104 operably connected 118 to the shaft breakaway 114 such that rotation of the shaft breakaway 114 causes rotation of the drive shaft 104. An external force on the drive shaft 104 that exceeds a threshold causes rotation of the shaft breakaway 114 such that the breakaway mechanism 120, 122 disengages the shaft breakaway 114 and the actuator breakaway 112.

Certain embodiments provide a breakaway drive system 102 comprising a shaft breakaway 114 connected to a drive shaft 104 and configured to rotate the drive shaft 104. The shaft breakaway 114 comprises a pocket 136 configured to receive a spring 120 and a ball 122. The breakaway drive system 102 comprises an actuator breakaway 112 configured to be rotated by an actuator 106. The actuator breakaway 112 comprises a surface 132 that comprises a dimple configured to receive the ball 122 such that the actuator breakaway 112 is disengagingly connected to the shaft breakaway 114. The spring 120 biases the ball 122 toward the surface 132 of the actuator breakaway 112 such that the ball 122 extends beyond the pocket 136 of the shaft breakaway 114 to mate with the dimple in the actuator breakaway surface 132. The shaft breakaway 114 is operably engaged with the actuator breakaway 112 when the ball 122 is fully seated in the dimple of the actuator breakaway surface 132 such that the shaft breakaway 114 rotates in unison with the actuator breakaway 112. The shaft breakaway 114 is disengaged with the actuator breakaway 112 and does not rotate in unison with the actuator breakaway 112 when an external force on the drive shaft 104 exceeds a threshold causing the ball 122 to unseat from the dimple of the actuator breakaway surface 132.

Various embodiments provide a method for operating a breakaway drive system 102. The method comprises receiving a signal to extend an actuator 106 for rotating a signage holder 100 to an open position. The method comprises extending the actuator 106 in response to the received signal. The actuator 106 is operably connected 130 to an actuator breakaway 112 that is disengagingly connected to a shaft breakaway 114. The shaft breakaway 114 is operably connected 118 to a drive shaft 104 for rotating the signage holder 100. The method comprises receiving an external force on the signage holder 100 that exceeds a threshold while extending the actuator 106. The method comprises disengaging the shaft breakaway 114 and the actuator breakaway 112 in response to the external force exceeding the threshold. The method comprises reengaging the shaft breakaway 114 and the actuator breakaway 112 using a return spring 124 after the external force subsides below the threshold. Reengaging the shaft breakaway 114 and the actuator breakaway 112 causes the drive shaft 104 to rotate the signage holder 100 to the open position.

Figure 2:
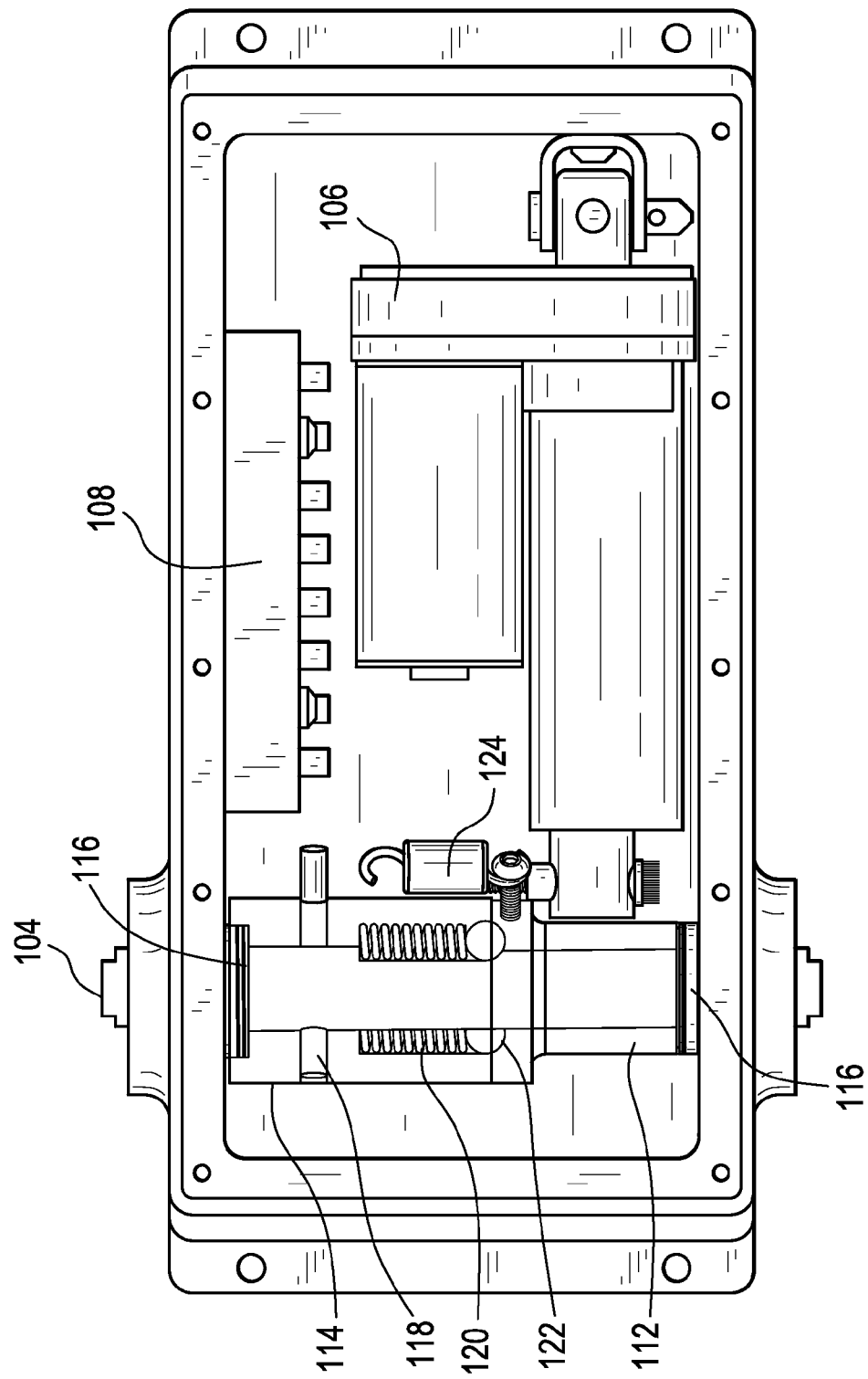
FIG. 2 is a side (partially sectioned) view of the exemplary breakaway drive system of FIG. 1 used in accordance with an embodiment of the present technology.
Figure 3:
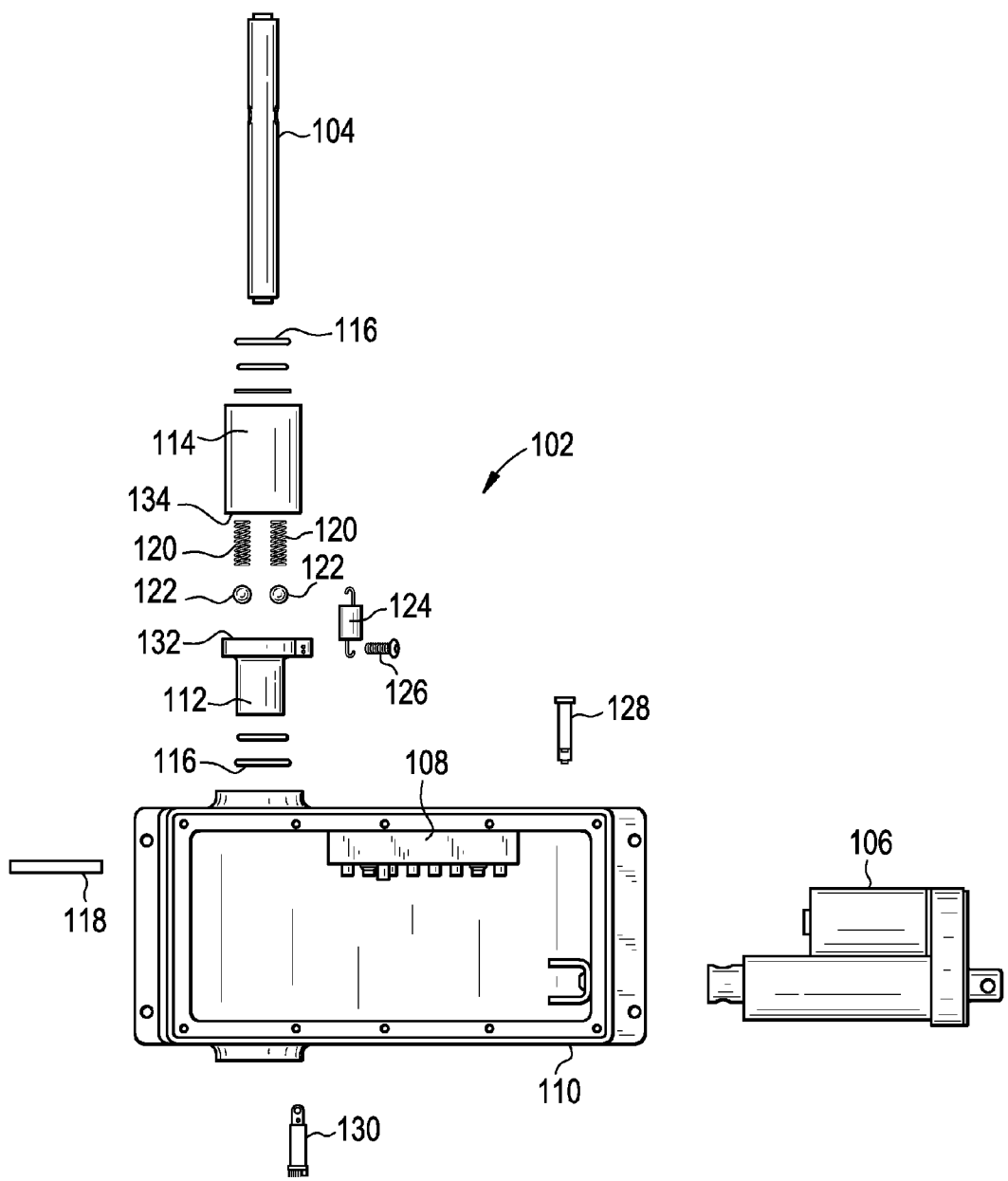
FIG. 3 is an exploded view of the exemplary breakaway drive system of FIG. 1 used in accordance with an embodiment of the present technology.
Figure 4:
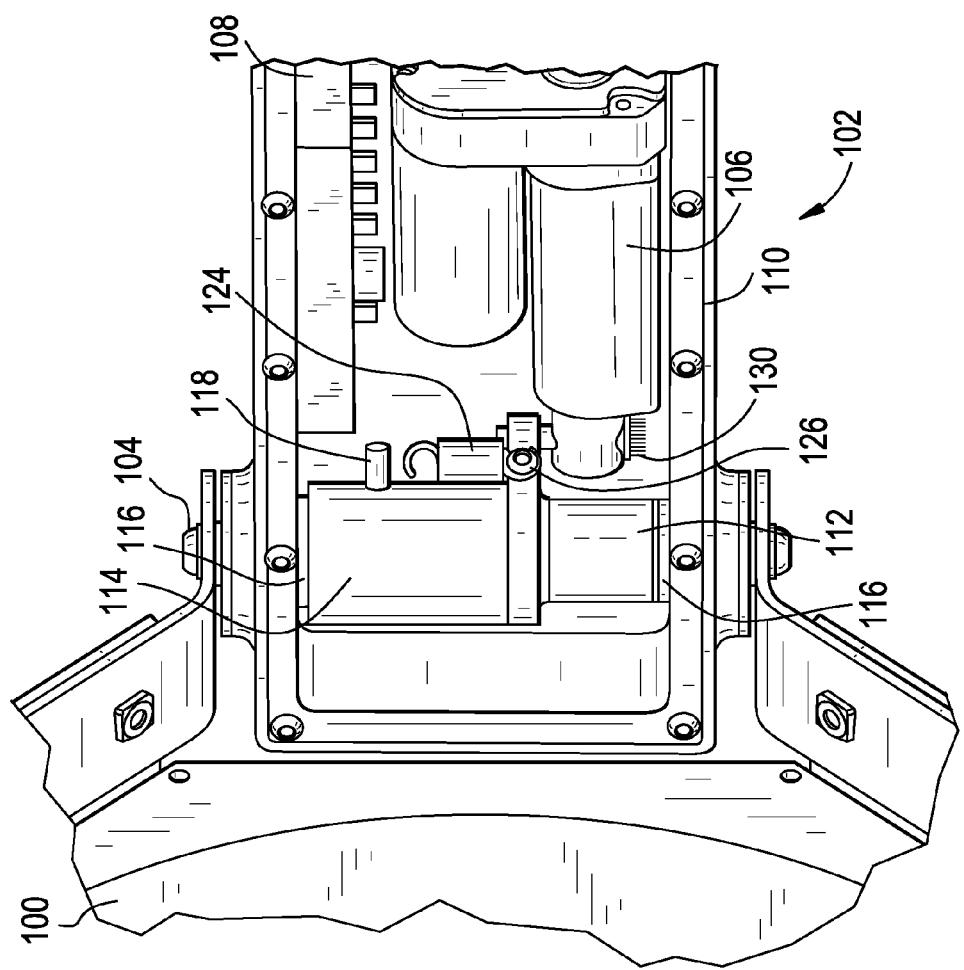
FIG. 4 is a side view of portions of the signage holder and the exemplary breakaway drive system of FIG. 1 used in accordance with an embodiment of the present technology.
Figure 5:
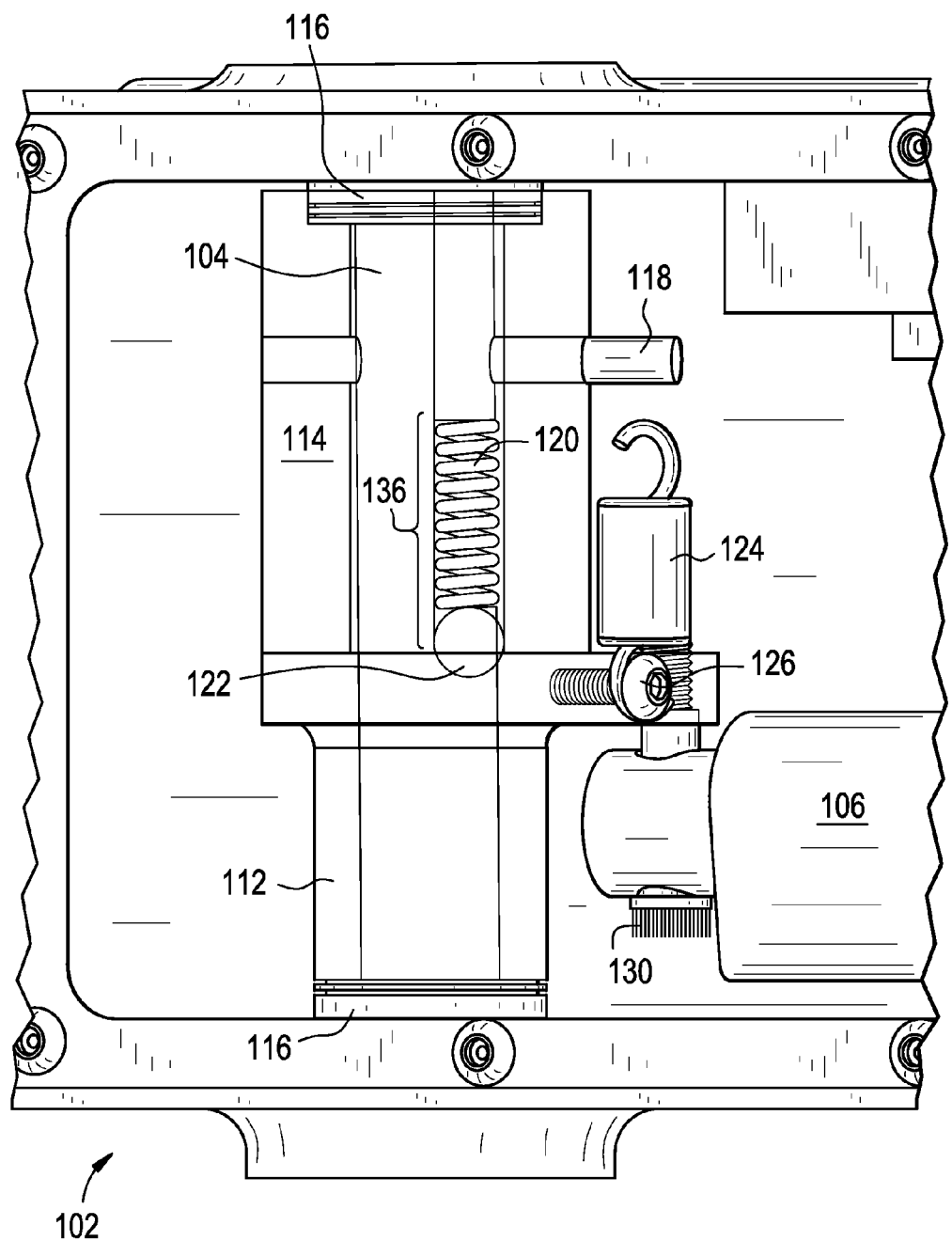
FIG. 5 is a side (partially sectioned) view of a portion of the exemplary breakaway drive system of FIG. 1 used in accordance with an embodiment of the present technology.
Figure 6:
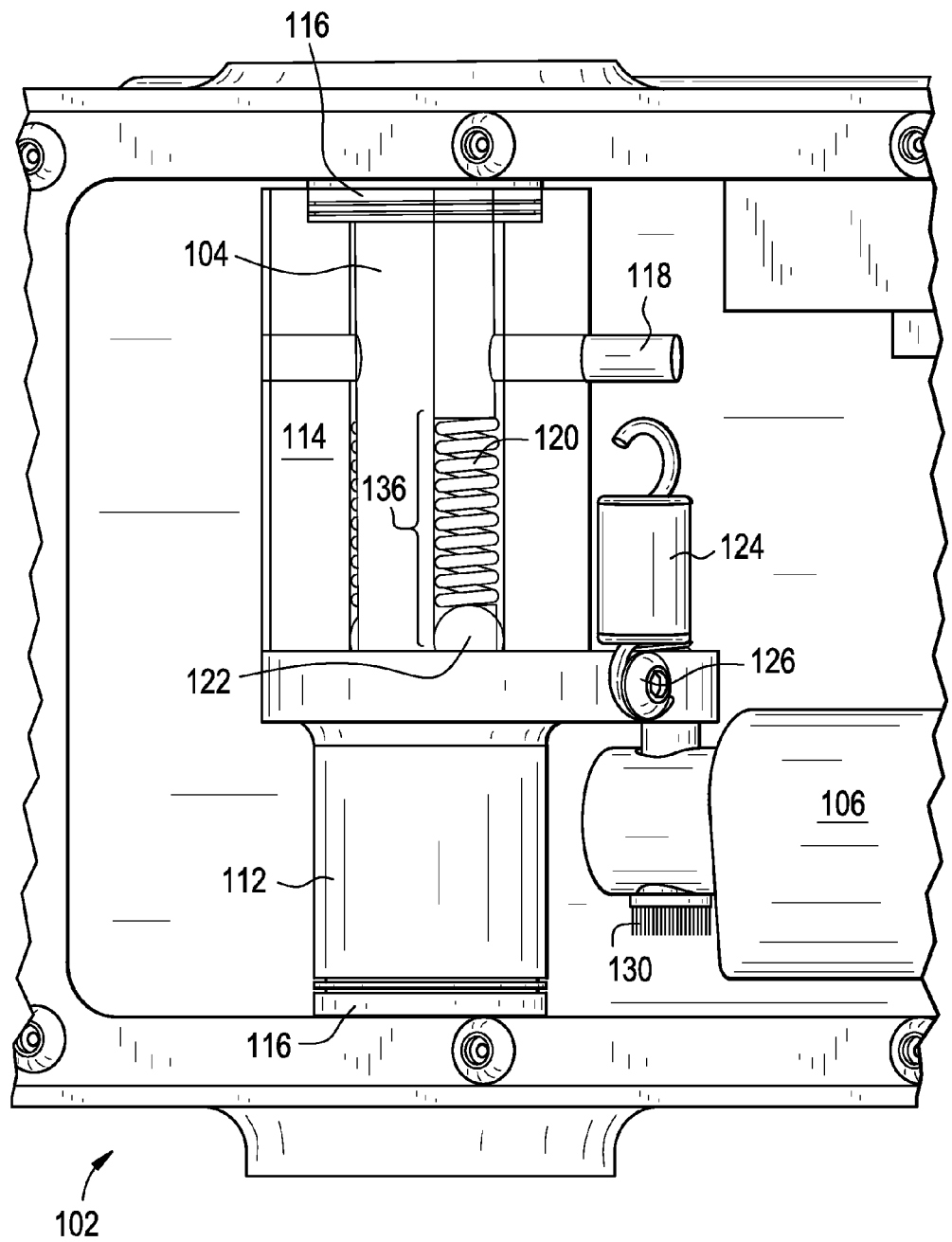
FIG. 6 is a side (partially sectioned) view of a portion of the exemplary breakaway drive system of FIG. 1 used in accordance with an embodiment of the present technology.

FIG. 1 is a perspective view of a signage holder 100 coupled to an exemplary breakaway drive system 102 used in accordance with an embodiment of the present technology. FIG. 2 is a side (partially sectioned) view of the exemplary breakaway drive system of FIG. 1. FIG. 3 is an exploded view of the exemplary breakaway drive system of FIG. 1. FIG. 4 is a side view of portions of the signage holder and the exemplary breakaway drive system of FIG. 1. FIG. 5 is a side (partially sectioned) view of a portion of the exemplary breakaway drive system of FIG. 1. FIG. 6 is a side (partially sectioned) view of a portion of the exemplary breakaway drive system of FIG. 1.

Certain embodiments provide a signage holder 100 that is operably connected to breakaway drive system 102 via drive shaft 104. Breakaway drive system 102 includes actuator 106 configured to rotate drive shaft 104 when actuator 106 is displaced laterally along axis x. Rotation of drive shaft 104 can cause displacement of signage holder 100 such that signage holder 100 can be actuated between a closed position substantially parallel to a side of a vehicle and an open position substantially perpendicular to the side of the vehicle. Actuator 106 is operably connected to electronic drive board 108 and can be controlled using electronic drive board 108. Breakaway drive system 102 is housed within housing 110.

Breakaway drive system 102 may also include actuator breakaway 112, shaft breakaway 114, thrust bearings 116, a breakaway mechanism 120, 122, return spring 124, and various connection mechanisms (e.g., dowel pin 118, screw 126, pin 128 and pin 130). Thrust bearings 116 may absorb force placed on the inner walls of housing 110 and prevent damage to housing 110 when drive shaft 104 rotates. In certain embodiments, breakaway mechanism 120, 122 may comprise, for example, springs 120 and balls 122 disposed inside pockets 136 of shaft breakaway 114. Actuator breakaway 112 is operably connected to actuator 106 via pin 130, or any other suitable connection mechanism, such that horizontal movement of actuator 106 causes actuator breakaway 112 to rotate. In certain embodiments, shaft breakaway 114 is disposed above actuator breakaway 112 and is operably connected thereto by return spring 124. Return spring 124 may include a hook, or any suitable connection mechanism, for attaching to shaft breakaway 114 via dowel pin 118. Screw 126, or any suitable connection mechanism, may connect return spring 124 to actuator breakaway 112. Return spring 124 is configured to bias a lower surface 134 of shaft breakaway 114 into contact with an upper surface 132 of actuator breakaway 112.

Shaft breakaway 114 is connected to drive shaft 104 via dowel pin 118, or any suitable connection mechanism, such that rotation of shaft breakaway 114 causes rotation of drive shaft 104. In certain embodiments, springs 120 and balls 122 of an exemplary breakaway mechanism are disposed inside shaft breakaway 114 such that balls 122 extend beyond the lower surface 134 of shaft breakaway 114 into dimples, or any other suitable depressions, in the upper surface 132 of actuator breakaway 112. Springs 120 are configured such that they exert a force on balls 122 to bias balls 122 toward the lower surface 134 of shaft breakaway 114 such that balls 122 are seated in the dimples of the upper surface 132 of actuator breakaway 112. The force of springs 120 on balls 122, thereby biasing balls 122 to be seated in dimples in the upper surface 132 of actuator breakaway 112, can create enough force between the two shafts 112, 114 that they will rotate in unison. Thus, rotation of actuator breakaway 112 can cause rotation of shaft breakaway 114, thereby causing rotation of dowel pin 118 and drive shaft 104, and thereby actuating signage holder 100. Although FIGS. 2-3 and 5-6 illustrate two pockets 136, more or less pockets, each comprising a spring 120 and a ball 122, may be provided.

In the event that an external force above a threshold, such as 16 pounds, for example, is exerted on signage holder 100, balls 122 will become unseated from the dimples in upper surface 132 of actuator breakaway 112, thereby disengaging actuator breakaway 112 such that rotational forces exerted by shaft breakaway 114 (due to the external force) are not communicated to actuator breakaway 112. Likewise, while balls 122 are unseated from the dimples in upper surface 132 of actuator breakaway 112, rotational forces exerted by actuator breakaway 112 (due to actuator 106) are not communicated to shaft breakaway 114. Balls 122 are biased back into seated engagement with actuator breakaway 112 by virtue of the spring force exerted by return spring 124.

In certain embodiments, the threshold may be variable based on one or more of, for example, the foot-pounds force associated with springs 120 and the depth of the pockets 136 of shaft breakaway 114. The threshold may correspond to an external force received at the signage holder 100. For example, the threshold may correspond to a gust of wind exceeding 40 miles per hour received at the center of signage holder 100. The threshold may be determined based on an amount of force that would cause the actuator to stall. As an example, a threshold may be set in the 15-17 pounds range if approximately 17.5 pounds of force on signage holder 100 would cause actuator 106 to stall.

In an embodiment, the breakaway drive system 102 can operate to move signage holder 100 from a closed position substantially parallel to a vehicle to an open position substantially perpendicular to the vehicle. Such an embodiment can operate as follows: (1) electronic drive board 108 is sent a signal to open from a bus door switch; (2) electronic drive board 108 turns on signal to initiate the actuator 106; (3) actuator 106 extends a suitable distance (e.g., approximately two inches), which rotates the actuator breakaway 112, thereby rotating the shaft breakaway 114 that is pinned to the drive shaft 104; and (4) the final result is the drive shaft 104 rotating approximately 90 degrees, thereby moving signage holder 100 from the closed position substantially parallel to the vehicle to the open position substantially perpendicular to the vehicle. The operation can be reversed to move signage holder 100 from the open position to the closed position.

In an embodiment, the breakaway drive system 102 can disengage if an external force (over a threshold amount) is exerted on signage holder 100, and thus on the drive shaft 104 while signage holder 100 is being moved between the open position and the closed position. Such an embodiment can operate as follows: (1) the actuator 106 is given the signal to extend; (2) the actuator 106 starts extending forward to its final destination of any suitable distance (e.g., 2 inches); (3) as the signage holder 100 is swinging open it is stopped by an external force (e.g., a strong gust of wind); (4) the actuator 106 continues to extend even though the signage holder 100 is stopped; (5) at the threshold (e.g., about 16 pounds of force against the signage holder 100), the balls 122 are forced upward out of the pockets 136 in the surface 132 of the actuator breakaway 112; (6) the actuator 106 reaches its final extension destination, which turns the actuator breakaway 112 to the open position; (7) the external force (e.g., wind) is no longer exerted on the signage holder 100; (8) the return spring 124 rotates the shaft breakaway 114 (to re-engage the breakaway mechanism) to the open position, thereby rotating the drive shaft 106 and the signage holder 100 to the open position; (9) once the signage holder 100 reaches the open position the spring pressure against the balls 122 from springs 120 forces them into the pockets in the surface 132 of the actuator breakaway 112; (10) the breakaway drive system 102 is now automatically reset.

Various embodiments provide a breakaway drive system 102 comprising an actuator 106. The breakaway drive system 102 comprises an actuator breakaway 112 operably connected 130 to the actuator 106. The actuator breakaway 112 is configured to be rotated when the actuator 106 is displaced. The breakaway drive system 102 comprises a shaft breakaway 114 comprising a breakaway mechanism 120, 122 for disengagingly connecting the actuator breakaway 112 to the shaft breakaway 114. The shaft breakaway 114 rotates in unison with the actuator breakaway 112 when the shafts are operably engaged. The shaft breakaway 114 does not rotate in unison with the actuator breakaway 112 when the shafts 112, 114 are disengaged. The breakaway drive system 102 comprises a drive shaft 104 operably connected 118 to the shaft breakaway 114 such that rotation of the shaft breakaway 114 causes rotation of the drive shaft 104. An external force on the drive shaft 104 that exceeds a threshold causes rotation of the shaft breakaway 114 such that the breakaway mechanism 120, 122 disengages the shaft breakaway 114 and the actuator breakaway 112.

In certain embodiments, the breakaway mechanism comprises a spring 120 and a ball 122.

In certain embodiments, the shaft breakaway comprises a pocket 136 configured to receive the spring 120 and the ball 122.

In certain embodiments, the actuator breakaway 112 comprises a surface 132 comprising a dimple configured to receive the ball 122. The spring 120 biases the ball 122 toward the surface 132 of the actuator breakaway 112 such that the ball 122 extends beyond the pocket 136 of the shaft breakaway 114 to mate with the dimple in the actuator breakaway surface 132. The shaft breakaway 114 is operably engaged with the actuator breakaway 112 when the ball 122 is fully seated in the dimple of the actuator breakaway surface 132.

In certain embodiments, the breakaway drive system 102 comprises a return spring 124 operably connecting 126 the shaft breakaway 114 and the actuator breakaway 112. The return spring 124 is configured to bias a surface 134 of the shaft breakaway 114 with a surface 132 of the actuator breakaway 112.

In certain embodiments, the return spring 124 applies a spring force to reengage the breakaway mechanism 120, 122 disengagingly connecting the actuator breakaway 112 to the shaft breakaway 114 after the external force that exceeds the threshold causes the breakaway mechanism 120, 122 to disengage the shaft breakaway 114 and the actuator breakaway 112.

In certain embodiments, the threshold is variable based on at least one of an amount of foot-pounds force associated with the spring 120 and a depth of the pocket 136.

In certain embodiments, the breakaway drive system 102 comprises a signage holder 100 operably connected to the drive shaft 104, wherein the signage holder 100 is actuated between a closed position substantially parallel to a side of a vehicle and an open position substantially perpendicular to the side of the vehicle.

In certain embodiments, the threshold corresponds to the external force on the drive shaft 104 being between 15 pounds and 17 pounds.

In certain embodiments, the threshold corresponds to the external force being a gust of wind exceeding 40 miles per hour at a center of the signage holder 100.

In certain embodiments, the breakaway drive system 102 comprises an electronic drive board 108. The actuator 106 is displaced based on a signal received from the electronic drive board 108.

In certain embodiments, the shaft breakaway comprises a second pocket 136 configured to receive a second spring 120 and a second ball 122. The surface 132 of the actuator breakaway 112 comprises a second dimple configured to receive the second ball 122.

In certain embodiments, displacement of the actuator 106 when the shaft breakaway 114 and the actuator breakaway 112 are operably engaged causes the drive shaft 104 to rotate approximately 90 degrees.

Certain embodiments provide a breakaway drive system 102 comprising a shaft breakaway 114 connected to a drive shaft 104 and configured to rotate the drive shaft 104. The shaft breakaway 114 comprises a pocket 136 configured to receive a spring 120 and a ball 122. The breakaway drive system 102 comprises an actuator breakaway 112 configured to be rotated by an actuator 106. The actuator breakaway 112 comprises a surface 132 that comprises a dimple configured to receive the ball 122 such that the actuator breakaway 112 is disengagingly connected to the shaft breakaway 114. The spring 120 biases the ball 122 toward the surface 132 of the actuator breakaway 112 such that the ball 122 extends beyond the pocket 136 of the shaft breakaway 114 to mate with the dimple in the actuator breakaway surface 132. The shaft breakaway 114 is operably engaged with the actuator breakaway 112 when the ball 122 is fully seated in the dimple of the actuator breakaway surface 132 such that the shaft breakaway 114 rotates in unison with the actuator breakaway 112. The shaft breakaway 114 is disengaged with the actuator breakaway 112 and does not rotate in unison with the actuator breakaway 112 when an external force on the drive shaft 104 exceeds a threshold causing the ball 122 to unseat from the dimple of the actuator breakaway surface 132.

In various embodiments, the breakaway drive system 102 comprises a return spring 124 operably connecting 126 the shaft breakaway 114 and the actuator breakaway 112. The return spring 124 is configured to bias a surface 134 of the shaft breakaway 114 with the surface 132 of the actuator breakaway 112.

In various embodiments, the return spring 124 applies a spring force to reengage the ball 122 into the dimple such that the actuator breakaway 112 is re-disengagingly connected to the shaft breakaway 114 after the external force that exceeds the threshold causes the ball 122 to unseat from the dimple disengaging the shaft breakaway 114 and the actuator breakaway 112.

In various embodiments, the threshold is variable based on at least one of an amount of foot-pounds force associated with the spring 120 and a depth of the pocket 136.

In various embodiments, the breakaway drive system 102 comprises a signage holder 100 operably connected to the drive shaft 104. The signage holder 100 is actuated between a closed position substantially parallel to a side of a vehicle and an open position substantially perpendicular to the side of the vehicle.

In various embodiments, the threshold corresponds to the external force on the drive shaft 104 being between 15 pounds and 17 pounds.

In various embodiments, the threshold corresponds to the external force being a gust of wind exceeding 40 miles per hour at a center of the signage holder 100.

In various embodiments, the shaft breakaway 114 comprises a second pocket 136 configured to receive a second spring 120 and a second ball 122. The surface 132 of the actuator breakaway 112 comprises a second dimple configured to receive the second ball 122.

Various embodiments provide a method for operating a breakaway drive system 102. The method comprises receiving a signal to extend an actuator 106 for rotating a signage holder 100 to an open position. The method comprises extending the actuator 106 in response to the received signal. The actuator 106 is operably connected 130 to an actuator breakaway 112 that is disengagingly connected to a shaft breakaway 114. The shaft breakaway 114 is operably connected 118 to a drive shaft 104 for rotating the signage holder 100. The method comprises receiving an external force on the signage holder 100 that exceeds a threshold while extending the actuator 106. The method comprises disengaging the shaft breakaway 114 and the actuator breakaway 112 in response to the external force exceeding the threshold. The method comprises reengaging the shaft breakaway 114 and the actuator breakaway 112 using a return spring 124 after the external force subsides below the threshold. Reengaging the shaft breakaway 114 and the actuator breakaway 112 causes the drive shaft 104 to rotate the signage holder 100 to the open position.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. A breakaway drive system comprising:
   an actuator;
   an actuator breakaway operably connected to the actuator, the actuator breakaway configured to be rotated when the actuator is displaced;
   a shaft breakaway comprising a breakaway mechanism providing a first connection of the actuator breakaway to the shaft breakaway, wherein the first connection is a disengageable connection, the shaft breakaway rotating in unison with the actuator breakaway when operably engaged, the shaft breakaway not rotating in unison with the actuator breakaway when disengaged; and
   a drive shaft operably connected to the shaft breakaway such that rotation of the shaft breakaway causes rotation of the drive shaft, wherein an external force on the drive shaft that exceeds a threshold causes rotation of the shaft breakaway such that the breakaway mechanism disengages the shaft breakaway and the actuator breakaway, and
   a return spring providing a second connection of the actuator breakaway to the shaft breakaway, wherein the return spring is configured to bias a surface of the shaft breakaway toward a surface of the actuator breakaway.

2. The system of claim 1, wherein the breakaway mechanism comprises a spring and a ball.

3. The system of claim 2, wherein the shaft breakaway comprises a pocket configured to receive the spring and the ball.

4. The system of claim 3, wherein the actuator breakaway comprises a surface comprising a dimple configured to receive the ball, wherein the spring biases the ball toward the surface of the actuator breakaway such that the ball extends beyond the pocket of the shaft breakaway to mate with the dimple in the actuator breakaway surface, and wherein the shaft breakaway is operably engaged with the actuator breakaway when the ball is fully seated in the dimple of the actuator breakaway surface.

5. The system of claim 1, wherein the return spring applies a spring force to reengage the first connection of the actuator breakaway to the shaft breakaway provided by the breakaway mechanism after the external force that exceeds the threshold causes the breakaway mechanism to disengage the shaft breakaway and the actuator breakaway.

6. The system of claim 3, wherein the threshold is variable based on at least one of an amount of foot-pounds of force associated with the spring and a depth of the pocket.

7. The system of claim 1 comprising a signage holder operably connected to the drive shaft, wherein the signage holder is actuated between a closed position substantially parallel to a side of a vehicle and an open position substantially perpendicular to the side of the vehicle.

8. The system of claim 1, wherein the threshold corresponds to the external force on the drive shaft being between 15 pounds and 17 pounds.

9. The system of claim 7, wherein the threshold corresponds to a gust of wind exceeding 40 miles per hour received at a center of the signage holder that provides the external force on the drive shaft causing rotation of the shaft breakaway such that the breakaway mechanism disengages the shaft breakaway and the actuator breakaway.

10. The system of claim 1 comprising an electronic drive board, wherein the actuator is displaced based on a signal received from the electronic drive board.

11. The system of claim 4, wherein the shaft breakaway comprises a second pocket configured to receive a second spring and a second ball, and wherein the surface of the actuator breakaway comprises a second dimple configured to receive the second ball.

12. The system of claim 1, wherein displacement of the actuator when the shaft breakaway and the actuator breakaway are operably engaged causes the drive shaft to rotate approximately 90 degrees.

13. A breakaway drive system comprising:
   a shaft breakaway connected to a drive shaft and configured to rotate the drive shaft, the shaft breakaway comprising a pocket configured to receive a spring and a ball;
   an actuator breakaway configured to be rotated by an actuator, the actuator breakaway comprising a surface that comprises a dimple configured to receive the ball such that a first connection of the actuator breakaway to the shaft breakaway is provided, wherein the first connection is a disengageable connection; and a return spring providing a second connection of the actuator breakaway to the shaft breakaway, wherein the return spring is configured to bias a surface of the shaft breakaway toward the surface of the actuator breakaway, wherein the spring biases the ball toward the surface of the actuator breakaway such that the ball extends beyond the pocket of the shaft breakaway to mate with the dimple in the actuator breakaway surface, wherein the shaft breakaway is operably engaged with the actuator breakaway when the ball is fully seated in the dimple of the actuator breakaway surface such that the shaft breakaway rotates in unison with the actuator breakaway, and wherein the shaft breakaway is disengaged with the actuator breakaway and does not rotate in unison with the actuator breakaway when an external force on the drive shaft exceeds a threshold causing the ball to unseat from the dimple of the actuator breakaway surface.

14. The system of claim 13, wherein the return spring applies a spring force to reengage the first connection of the actuator breakaway to the shaft breakaway provided by the ball fully seated in the dimple after the external force that exceeds the threshold causes the ball to unseat from the dimple disengaging the shaft breakaway and the actuator breakaway.

15. The system of claim 13, wherein the threshold is variable based on at least one of an amount of foot-pounds force associated with the spring and a depth of the pocket.

16. The system of claim 13 comprising a signage holder operably connected to the drive shaft, wherein the signage holder is actuated between a closed position substantially parallel to a side of a vehicle and an open position substantially perpendicular to the side of the vehicle.

17. The system of claim 13, wherein the threshold corresponds to the external force on the drive shaft being between 15 pounds and 17 pounds.

18. The system of claim 16, wherein the threshold corresponds to a gust of wind exceeding 40 miles per hour received at a center of the signage holder that provides the external force on the drive shaft causing the ball to unseat from the dimple of the actuator breakaway surface.

19. The system of claim 13, wherein the shaft breakaway comprises a second pocket configured to receive a second spring and a second ball, and wherein the surface of the actuator breakaway comprises a second dimple configured to receive the second ball.

20. A method for operating a breakaway drive system, the method comprising:

receiving a signal to extend an actuator for rotating a signage holder to an open position;

extending the actuator in response to the received signal, wherein the actuator is operably connected to an actuator breakaway that is disengagingly connected to a shaft breakaway, wherein the shaft breakaway is operably connected to a drive shaft for rotating the signage holder;

receiving an external force on the signage holder that exceeds a threshold while extending the actuator;

disengaging the shaft breakaway and the actuator breakaway in response to the external force exceeding the threshold;

reengaging the shaft breakaway and the actuator breakaway using a return spring after the external force subsides below the threshold, wherein the return spring operably connects the shaft breakaway and the actuator breakaway, wherein the return spring is configured to bias a surface of the shaft breakaway toward a surface of the actuator breakaway, and wherein reengaging the shaft breakaway and the actuator breakaway causes the drive shaft to rotate the signage holder to the open position.

* * * * *